United States Patent [19]

Kestermeier et al.

[11] 3,893,546
[45] July 8, 1975

[54] DISC BRAKE SUPPORT AND CALIPER MOUNTING

[75] Inventors: William J. Kestermeier; Richard T. Burnett, both of South Bend, Ind.

[73] Assignee: The Bendix Corporation, South Bend, Ind.

[22] Filed: May 20, 1974

[21] Appl. No.: 471,377

[52] U.S. Cl. .............................................. 188/73.3
[51] Int. Cl. ............................................ F16d 65/02
[58] Field of Search ........ 188/73.3, 73.4, 72.4, 72.5

[56] References Cited
UNITED STATES PATENTS

| | | | |
|---|---|---|---|
| 3,155,194 | 11/1964 | Gancel | 188/73.3 X |
| 3,388,774 | 6/1968 | Burnett | 188/73.5 |
| 3,677,372 | 7/1972 | Burnett | 188/73.3 |
| 3,805,925 | 4/1974 | Schoenhenz | 188/73.3 |

FOREIGN PATENTS OR APPLICATIONS

| | | | |
|---|---|---|---|
| 2,014,468 | 10/1970 | Germany | 188/73.3 |

Primary Examiner—George E. A. Halvosa
Attorney, Agent, or Firm—Ken C. Decker; William N. Antonis

[57] ABSTRACT

A disc brake for an automotive vehicle is disclosed. The brake includes a stationary support member, a rotor, a pair of friction elements for brake engagement with the rotor when a brake application is effected, and a caliper slidably mounted on the support member and engaging each of the friction elements for urging them against the rotor. The torque member includes a pair of circumferentially spaced arms defining a recess therebetween, and the outer edge of one of the arms is provided with a socket which receives the pinlike element carried by the caliper so that braking torque is transmitted from the caliper to the torque member through the pinlike member and the socket during braking while the rotor is rotating in one direction. The opposite edge of the one arm, which faces into the recess, is provided with a bearing surface which cooperates with a corresponding bearing surface on the caliper so that braking torque is transmitted from the caliper to the torque through the bearing surfaces during braking while the rotor is rotating in the opposite direction. A releasable connection between the other arm of the torque member and the caliper restrains rotation of the caliper about the pinlike element. However, this connection may be manually released so that the caliper can be pivoted about the pinlike member to expose the friction elements when they require servicing.

10 Claims, 3 Drawing Figures

3,893,546

DISC BRAKE SUPPORT AND CALIPER MOUNTING

BACKGROUND OF THE INVENTION

This invention relates to a disc brake for an automotive vehicle.

Our present invention relates to an improvement in the brake disclosed in U.S. Pat. No. 3,388,774, owned by the assignee of the present invention and incorporated herein by reference. Brakes of the type disclosed in the aforementioned patent possess many advantages over other types of disc brakes. Among these advantages are the relatively low sliding friction between the caliper and support member and the fact that braking torque generated by the engagement of both of the friction elements with their corresponding friction faces of the rotor is never transmitted to the same arm of the torque member at the same time. The main purpose of the present invention is to simplify the construction of the brake disclosed in the aforementioned patent to thereby reduce its cost without unduly sacrificing braking performance.

SUMMARY OF THE INVENTION

Therefore, an important object of our present invention is to provide a simplified disc brake construction which is consequently lower in cost than prior art disc brakes.

Another important object of our invention is to provide a disc brake which requires only one pin to mount the caliper to the support member.

Another important object of our invention is to provide a brake in which the braking torques generated by engagement of the friction elements with the rotor are never taken by the same arm of the torque member during braking while the vehicle is moving in a forward direction, but which may be taken by the same arm of the torque member when the vehicle is backing.

Another important object of our present invention is to facilitate servicing of the friction elements when the latter require replacement by providing a releasable connection between the caliper and the torque member so that, upon release of this connection, the caliper may be pivoted about the pinlike member to expose the friction elements.

DETAILED DESCRIPTION

Figure 1:
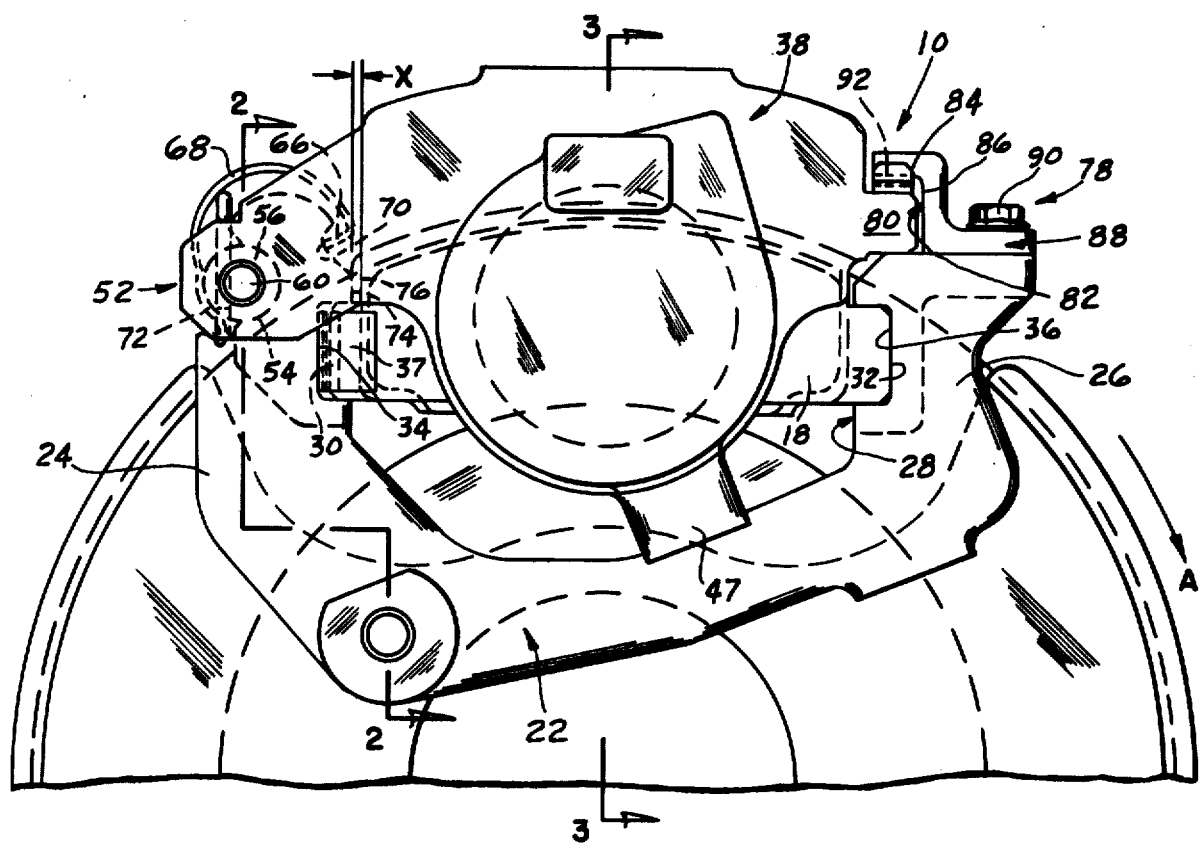
FIG. 1 is a slide elevation of a disc brake made pursuant to the teachings of our present invention.

Referring now to the drawings, a disc brake generally indicated by the numeral 10 includes a rotor 12 having a pair of friction faces 14 and 16. A pair of friction elements 18, 20 are exposed adjacent the friction faces 14 and 16, respectively, and are adapted to be urged into braking engagement with their corresponding friction faces 14 or 16 when a brake application is effected. The brake 10 further includes a stationary support member generally indicated by the numeral 22, which is rigidly secured to any nonrotative portion of the vehicle adjacent the rotor 12. The support member 22 includes a pair of circumferentially spaced arms 24, 26 which define a recess 28 therebetween. The friction element 18 is slidably disposed in the recess 28 for movement toward or away from the friction face 14, and is provided with bearing surfaces 30, 32 on opposite edges thereof which cooperate with corresponding bearing surfaces 34, 36 on the edges of the arms 24, 26, respectively, which face into the recess 28. An antirattle spring 37 is disposed between bearing surfaces 30 and 34.

The brake 10 further includes a caliper generally indicated by the numeral 38 which is slidably mounted on the torque member 22 for transverse movement with respect to the rotor 12 in a manner to be more fully described hereinafter. The caliper 38 includes a fluid motor housing 40 which defines a bore 42 therewithin which slidably receives a piston 44. The rear face of the piston 44 cooperates with the end of the bore 42 to define a variable volume fluid chamber 46 therewithin which is communicated to any suitable pressure source, such as the vehicle master cylinder through inlet port 47. The caliper 38 further includes a bridge portion 48 extending from the fluid motor portion 40 and which straddles the periphery of the rotor 12, and a radially inwardly extending portion 50 which extends parallel to the friction face 16 and upon which the friction element 20 is rigidly secured. It will be noted that the braking torque generated by engagement of the friction element 20 with the friction face 16 is transmitted through the caliper 38 while the braking torque generated by the friction element 18 with the friction face 14 is transmitted directly to one of the arms 24, 26 of the torque member 22.

The caliper 38 is slidably mounted on the torque member 22 by a pin means generally indicated by the numeral 52. The pin means 52 includes a socket 54 on the outer edge of the arm 24 which slidably receives a sleeve 56. This can be seen most clearly in FIG. 1; the socket 54 embraces a portion of the outer circumferential surface of the sleeve 56, but the socket 54 is open at one side thereof to permit limited movement of the sleeve out of the recess. A portion of the caliper 38 is cut away to define a recess 58 therein, and opposite ends of a pinlike element 60 which bridges the recess 58 are secured to caliper portions 62 and 64, respectively. The pinlike element 60 extends through the sleeve 56 and is slidable with respect thereto. A hooked end 66 of a resilient clip 68 is engaged in a recess 70 on the arm 24, and a portion 72 of the clip 68 engages a portion of the outer circumferential surface of the sleeve 56 which projects from the socket 54. The clip 68 exerts a biasing force on the sleeve 56, urging the latter into the socket 54. A bearing surface 74 is defined on the edge of the arm 24 facing into the recess 28, which is designed to cooperate with another bearing surface 76 on the caliper 38. Consequently, it will be noted that the extent of movement of the sleeve 56 out of the socket 54 is limited to the distance X between the bearing surfaces 74 and 76.

Releasable means generally indicated by the numeral 78 connects the arm 26 with the caliper 38 to thereby restrain rotation of the caliper 38 about the pin means 52. The releasable connection 78 includes a tongue 80 which projects from one side of the caliper 38 and which is slidably received in a groove 82. The lower surface of the groove 82 is defined by the upper edge of the arm 26, and the upper surface 84 and joining edge 86 of the groove 82 is defined on an element 88 which is fastened to the arm 26 by a bolt 90. An antirattle spring 92 is disposed in the groove 82 to prevent rattling of the caliper on the torque member.

MODE OF OPERATION

Figure 3:
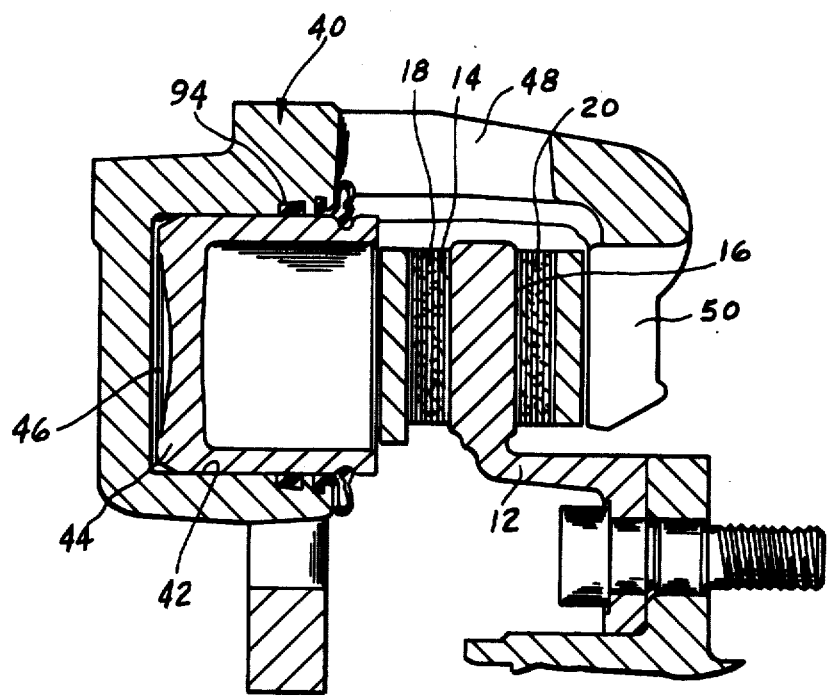
FIG. 3 is a cross sectional view taken substantially along lines 3—3 of FIG. 1.

During forward movement of the vehicle, the rotor rotates in the direction indicated by the arrow A. When a brake application is effected, fluid pressure from the master cylinder of the vehicle is communicated into the chamber 46, where it reacts on the piston 44 to urge the latter to the right viewing FIG. 3, thereby urging the friction element 18 into braking engagement with the friction face 14 of rotor 12. Because of the slidable connection between the caliper and the support member, reaction forces acting through the bridge portion 48 of the caliper slides the pin 60 relative to the sleeve 56 so that the friction element 20 is urged into braking engagement with the friction face 16, thereby retarding rotation of the rotor 12. It will be noted that the braking torque generated by the engagement of friction element 18 with friction face 14 is transmitted to the torque member 22 through the bearing surfaces 32 and 36 to the arm 26. The braking torque generated by engagement of the friction element 20 with the friction face 16 is transmitted through the caliper 38, the pin-like element 60, and the sleeve 56 to the socket 54, and therefore to the arm 24.

If the brake is applied while the vehicle is backing, the rotor 12 will rotate in a direction opposite to the direction indicated by the arrow A. When the brake is applied, the braking torque generated by engagement of the friction element 18 with the friction face 14 is transmitted to arm 24 through the bearing surfaces 30 and 34. The torque generated by engagement of the friction element 20 with the friction face 16 is transmitted through the caliper 38, driving the bearing surface 76 of the latter into engagement with bearing surface 74, so that the braking torque is transmitted from the caliper 38 to the support member 22 through the bearing surfaces 76, 74. As the caliper 38 shifts, the pin means 52 will be urged out of the socket 54 by a distance equal to the distance X in FIG. 1. When the brake is released, the resiliency of the clip 68 urges the sleeve 56 back into its associated socket 54.

Figure 2:
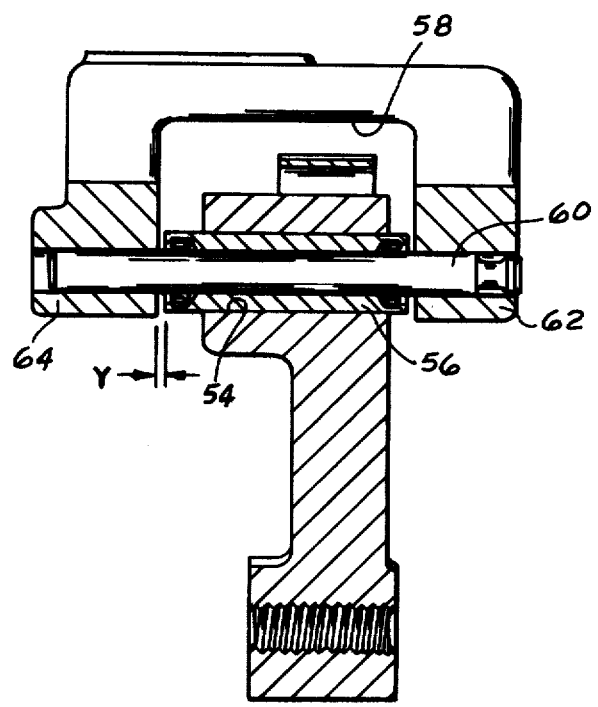
FIG. 2 is a cross sectional view taken substantially along lines 2—2 of FIG. 1.

Of course, repeated brake applications result in wear of the friction elements 18, 20. However, the clearance between the friction element 18 and the friction face 14 when the brake is released is maintained a constant because the return seal 94 limits retraction of the piston to a predetermined amount, as disclosed in U.S. Pat. No. 3,377,076, owned by the assignee of the present invention. However, wear of the friction elements 20 in excess of the amount Y in FIG. 2 will, on later brake applications, cause the caliper portion 64 to engage the end of the sleeve 56 to reposition the latter in the socket 54, as is more completely described in the aforementioned U.S. Pat. No. 3,388,774, owned by the assignee of the present invention. Consequently, the running clearances between the friction elements 18 and 20 and their associated friction faces 14 and 16 is maintained at a substantially constant distance throughout the life of the friction elements.

After each of the friction elements 18, 20 have worn a sufficient amount that their replacement is required, the brake may be serviced by removing the bolt 90 so that the element 88 may be removed. This permits the caliper 38 to be pivoted about the pin means 52, thereby exposing the friction elements 18 and 20 to permit their replacement. After they are replaced, the caliper 38 may be swung back into position illustrated in FIG. 1 and the element 88 and bolt 90 replaced.

We claim:

1. In a brake, a rotor having a pair of friction faces, a pair of friction elements, one of said elements being disposed adjacent each of said friction faces, a support member mounted adjacent one of said friction faces, said support member having a pair of circumferentially spaced arms defining a recess therebetween, a member straddling said rotor and engaging each of said friction elements for urging the latter into braking engagement with their corresponding friction faces when a brake application is effected, at least one of the friction elements being secured to the straddling member, means slidably mounting said straddling member on said support member for transverse relative movement with respect to said rotor, said slidably mounting means including a socket on the outer edge of one of said arms, and pin means connected to said straddling member and received in said socket whereby braking torque is transmitted from the straddling member to the support member through the pin means and said socket when braking during rotation of said rotor in one direction, the edge of said one arm facing into said recess having a bearing surface cooperating with a corresponding bearing surface on said straddling member whereby braking torque is transmitted from the straddling member to said torque member through said bearing surfaces upon braking during rotation of said rotor in the opposite direction, and means operatively connecting the other arm of the support member and the straddling member for inhibiting rotation of said straddling member about said pin means.

2. The invention of claim 1,
    said means inhibiting rotation of said straddling member including a manually releasable connection between said members whereby upon release of said releasable connection the straddling member may be pivoted about said pin means to expose said friction elements for servicing.

3. The invention of claim 1,
    said means inhibiting rotation of said straddling member including a tongue-and-groove connection between said support member and said straddling member, and releasable means for permitting removal of one edge of said groove to allow rotation of said straddling member about said pin means to expose said friction elements for servicing.

4. The invention of claim 1,
    said pin means including a sleeve, and a pin element connected to said straddling member and extending through said sleeve, said socket slidably receiving said sleeve.

5. The invention of claim 4,
    said socket being a recess in said one arm embracing a portion of the outer circumferential surface of said sleeve, said recess being open at one side thereof whereby a portion of the outer circumferential surface of said sleeve projects from said recess to permit limited movement of said pin means out of said recess.

6. The invention of claim 5; and
    resilient means yieldably urging said sleeve into said recess.

7. The invention of claim 6, said resilient means being a spring clip, one end of said clip engaging said one arm, the body of said clip engaging the portion of the outer circumferential surface of said sleeve projecting from said recess.

8. The invention of claim 4, said socket being a recess in said one arm embracing a portion of the outer circumferential surface of said sleeve, said recess being open at one side thereof whereby a portion of the outer circumferential surface of said sleeve projects from said recess to permit limited movement of said pin means out of said recess, the extent of said limited movement of the pin means out of said recess being controlled by engagement of the bearing surface on said straddling member with the bearing surface on said one arm.

9. The invention of claim 1, one of said friction elements being received in the recess defined between said arms, said one friction element having anchoring areas on opposite ends thereof to cooperate with corresponding anchoring areas on each of said arms to transmit braking torque generated by engagement of said one friction element with its corresponding friction face directly to said support member whereby only the braking torque generated by engagement of the other friction element with its corresponding friction face is transmitted through said straddling member.

10. In a brake, a rotor having a pair of friction faces, a pair of friction elements, one of said elements being disposed adjacent each of said friction faces, a support member mounted adjacent one of said friction faces, said support member having a pair of circumferentially spaced arms defining a recess therebetween, a member straddling said rotor and engaging each of said friction elements for urging the latter into braking engagement with their corresponding friction faces when a brake application is effected, means slidably mounting said straddling member on said support member for transverse relative movement with respect to said rotor, said slidably mounting means including a socket on the outer edge of one of said arms, and pin means connected to said straddling member and received in said socket whereby braking torque is transmitted from the straddling member to the support member through the pin means and said socket when braking during rotation of said rotor in one direction, the edge of said one arm facing into said recess having a bearing surface cooperating with a corresponding bearing surface on said straddling member whereby braking torque is transmitted from the straddling member to said torque member through said bearing surfaces upon braking during rotation of said rotor in the opposite direction, and means operatively connecting the other arm of the support member and the straddling member for inhibiting rotation of said straddling member about said pin means, said pin means including a sleeve, and a pin element connected to said straddling member and extending through said sleeve, said socket slidably receiving said sleeve, said socket being a recess in said one arm embracing a portion of the outer circumferential surface of said sleeve, said recess being open at one side thereof whereby a portion of the outer circumferential surface of said sleeve projects from said recess to permit limited movement of said pin means out of said recess, resilient means yieldably urging said sleeve into said recess, a detent defined in said one arm on the side of the latter opposite said recess, said resilient means being a spring clip, one end of said clip engaging said detent, said clip including a body portion extending from the first end around the end of said one arm, said body portion including another portion engaging the portion of the outer circumferential surface of said sleeve projecting from said recess.

\* \* \* \* \*